(12) United States Patent
Dopilka

(10) Patent No.: US 9,402,028 B2
(45) Date of Patent: Jul. 26, 2016

(54) IMAGE STABILIZATION AND TRACKING SYSTEM

(75) Inventor: David J. Dopilka, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 959 days.

(21) Appl. No.: 13/421,345

(22) Filed: Mar. 15, 2012

(65) Prior Publication Data

US 2013/0242112 A1 Sep. 19, 2013

(51) Int. Cl.
*H04N 5/232* (2006.01)
*G02B 27/64* (2006.01)

(52) U.S. Cl.
CPC .......... *H04N 5/23258* (2013.01); *G02B 27/648* (2013.01); *H04N 5/23254* (2013.01); *H04N 5/23287* (2013.01)

(58) Field of Classification Search
USPC ............................................ 348/169; 396/55
See application file for complete search history.

(56) References Cited

U.S. PATENT DOCUMENTS

| | | | | |
|---|---|---|---|---|
| 4,181,408 A * | 1/1980 | Senders | ................. | A63B 3/113 351/159.68 |
| 5,012,270 A * | 4/1991 | Sekine | ................. | G01S 3/7864 348/208.99 |
| 5,162,641 A * | 11/1992 | Fountain | ................. | A61F 9/008 250/201.2 |
| 6,072,525 A * | 6/2000 | Kaneda | ................. | G01S 3/7864 348/169 |
| 6,714,240 B1 | 3/2004 | Caswell | | |
| 8,553,113 B2 * | 10/2013 | Ansari | ................. | H04N 3/1593 348/148 |
| 2005/0280707 A1 | 12/2005 | Sablak et al. | | |
| 2006/0018643 A1 | 1/2006 | Stavely et al. | | |
| 2006/0251410 A1 * | 11/2006 | Trutna, Jr. | ................. | G03B 5/02 396/55 |
| 2008/0024649 A1 * | 1/2008 | Okawara | ................. | G03B 13/14 348/347 |
| 2008/0118104 A1 * | 5/2008 | Ariyur | ................. | F41G 3/02 382/103 |
| 2011/0194734 A1 | 8/2011 | Gensolen et al. | | |
| 2011/0226955 A1 * | 9/2011 | Luty | ................. | G02B 27/644 250/353 |

FOREIGN PATENT DOCUMENTS

WO WO 2009002004 A1 * 12/2008

OTHER PUBLICATIONS

EP Search Report for Application No. EP 13 157 696.9 dated Jun. 21, 2013.
EP Office Action for Application No. EP 13 157 696.9 dated Jul. 4, 2013.

(Continued)

*Primary Examiner* — Geepy Pe
*Assistant Examiner* — Tyler W Sullivan
(74) *Attorney, Agent, or Firm* — Ingrassia Fisher & Lorenz, P.C.

(57) ABSTRACT

An image stabilization and tracking system includes a primary imaging detector, a stabilization and tracking detector, an image processing and correction command control, and an adaptive optic device. The primary imaging detector is configured to detect, within a field of view, images of a primary object in an optic image. The stabilization and tracking detector is disposed outside of the field of view, and is configured to detect images of a tracking object in the optic image. The image processing and correction command control is coupled to receive the images of, and is configured to detect relative movement of, the tracking object. The adaptive optic device is coupled to receive correction commands and is configured, in response thereto, to move and thereby vary a position of the optic image.

7 Claims, 2 Drawing Sheets

(56) References Cited

OTHER PUBLICATIONS

Gensolen, F. et al.; An image sensor with global motion estimation for micro camera module, STMicroelectronics; University de Montpellier (France).

Puschell, J.J. et al.; The research of real-time image stabilization in the focal plane based on motion detection; SPIE Digital Library, International Symposium on Photoelectronic Detection and Imaging 2011: Advances in Infrared Imaging and Applications; Shanghai Institute of Technical Physics.

Janschek, K. et al.; A Visual feedback approach for focal plane stabilization of a high resolution space camera.

* cited by examiner

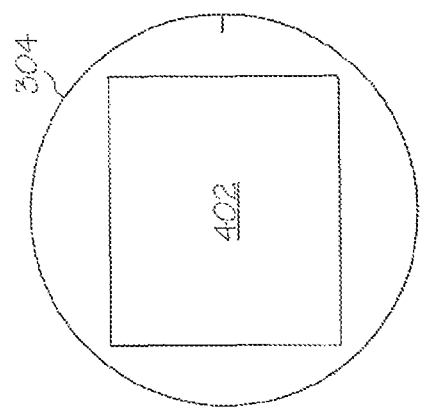
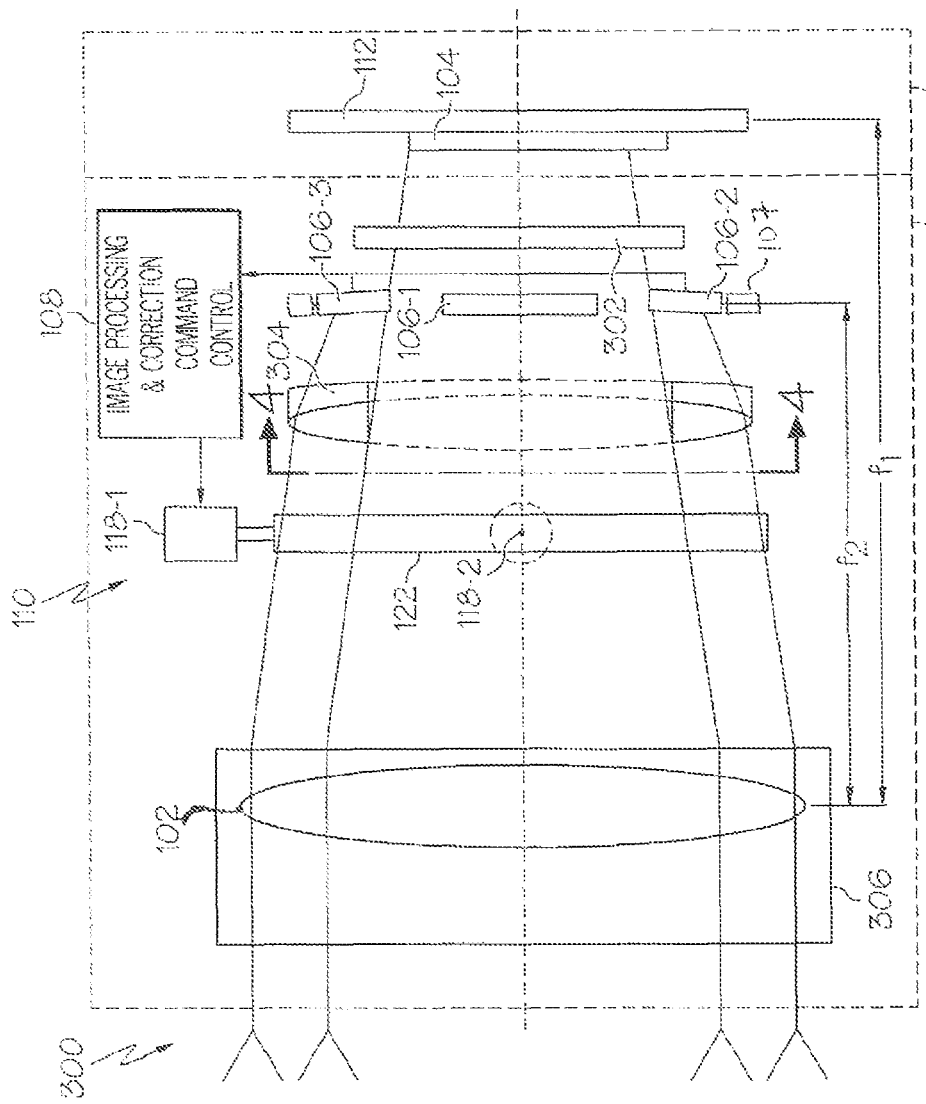

IMAGE STABILIZATION AND TRACKING SYSTEM

TECHNICAL FIELD

The present invention generally relates to image stabilization, and more particularly relates to systems for tracking and stabilizing images.

BACKGROUND

When capturing an image (either a still image or video image) using an imaging device, the captured image can blur if the imaging device, the object being imaged, or both, are in motion. The motions of the imaging device and the object being imaged may be composed of many components over a wide frequency range. For example, relatively high-frequency vibration from mechanical systems, to relatively lower frequency motion such as relative geometric motion between the imaging device and the object being imaged.

Image stabilization techniques have been developed to eliminate, or at least reduce, image blurring associated with such motions. Current real-time image stabilization techniques fall generally into two classifications, optical image stabilization and digital image stabilization. Optical image stabilization is the preferred approach for high performance systems because of its high image quality. Current optical image stabilization techniques use rate sensors to detect and correct disturbances to the imaging system, but are not configured to detect and compensate for any motion of the object itself. Thus, image blurring may still occur when the object being imaged is moving. Digital image stabilization techniques typically implement digital transformations on portions of the image itself. These techniques can reduce vibrations from video images or improve still image quality, but can increase noise in the captured images. Current image stabilization techniques may also rely on radar or laser tracking devices to provide object designation and tracking functions. These tracking devices can be relatively complex, heavy, and costly.

This is a problem when attempting to track and image moving objects such as missiles, aircraft, spacecraft, planetary surfaces from orbiting spacecraft, and astronomical bodies, or more terrestrial uses such as sporting events photography and law enforcement imaging. It is equally a problem when the imaging system itself is moving and is tracking and imaging other stationary or moving objects.

The above-described issues can be exacerbated for imaging applications that rely on a filter. Some example applications include polarizing, RGB, photometric, UV, IR, and narrow band filtered imaging. When stabilization and/or tracking is used with filtered imaging, the light intensity falling on the stabilization and tracking detector(s) may be reduced. This is because the stabilization and tracking detector(s) may share the filtered illuminated field with the primary imaging detector. This can cause reduced signal-to-noise ratio and degraded stabilization and tracking performance. To try and alleviate this issue, some systems may include a separate tracking optic and imager, which can increase overall system complexity and cost.

Hence, there is a need for an image stabilization and tracking system, for both filtered and unfiltered imaging applications, that does not rely on relatively complex, heavy, and/or expensive tracking devices and/or separate tracking optics and imagers. There is also a need for an image stabilization and tracking system that compensates for all motion components simultaneously at most (if not all) of the frequencies for both the imaging device and object being imaged. The present invention addresses at least these needs.

BRIEF SUMMARY

In one embodiment, an image stabilization and tracking system includes a primary imaging detector, a stabilization and tracking detector, an image processing and correction command control, and an adaptive optic device. The primary imaging detector has a field of view and is configured to detect, within the field of view, images of a primary object in an optic image. The stabilization and tracking detector is disposed outside of the field of view of the primary imaging detector, and is configured to detect images of a tracking object in the optic image. The image processing and correction command control is coupled to receive the images of the tracking object from the stabilization and tracking detector, and is configured to detect relative movement of the tracking object and supply correction commands. The adaptive optic device is coupled to receive the correction commands and is configured, in response thereto, to move and thereby vary a position of the optic image.

In another embodiment, an image stabilization and tracking system includes a primary imaging detector, a stabilization and tracking detector, an optic filter, an image processing and correction command control, an adaptive optic device, and a decoupling focal reducer. The primary imaging detector has a field of view and is configured to detect, within the field of view, images of a primary object in an optic image. The stabilization and tracking detector is disposed outside of the field of view of the primary imaging detector, and is configured to detect images of a tracking object in the optic image. The optic filter is disposed between the primary imaging detector and the stabilization and tracking detector, and is configured to filter a portion of the optic image. The image processing and correction command control is coupled to receive the images of the tracking object from the stabilization and tracking detector, and is configured to detect relative movement of the tracking object and supply correction commands. The adaptive optic device is coupled to receive the correction commands and is configured, in response thereto, to move and thereby vary a position of the optic image. The decoupling focal reducer is disposed between the adaptive optic device and the stabilization and tracking detector. The decoupling focal reducer is configured to provide (i) a first focal length within the field of view of the primary imaging detector and (ii) a second focal length outside the field of view of the primary imaging detector, the second focal length different than the first focal length.

In still another embodiment, an image stabilization and tracking system includes an imaging optic, a multiple degree-of-freedom platform, a primary imaging detector, a plurality of stabilization and tracking detectors, an image processing and correction command control, and an adaptive optic device. The imaging optic is adapted to receive electromagnetic radiation and is configured, upon receipt thereof, to form an optic image. The multiple degree-of-freedom platform is adapted to receive positioning commands and is configured, upon receipt thereof, to move. The primary imaging detector has a field of view and is configured to detect, within the field of view, images of a primary object in the optic image. The plurality of stabilization and tracking detectors is mounted on the multiple degree-of-freedom platform and is disposed outside of the field of view of the primary imaging detector. Each stabilization and tracking detector is configured to detect images of one or more tracking objects in the optic image. The image processing and correction command control is coupled to receive the images of the one or more tracking objects from the stabilization and tracking detectors, and is configured to detect relative movement of one of the tracking objects and supply the positioning commands to the multiple degree-of-freedom platform, and correction commands. The adaptive optic device is coupled to receive the correction commands and is configured, in response thereto, to move and thereby vary a position of the optic image.

Furthermore, other desirable features and characteristics of the image stabilization and tracking system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 3 depicts a schematic representation of another embodiment of an image stabilization and tracking system that may be used for filtered imaging applications; and FIG. 4 depicts a portion of the system depicted in FIG. 3, looking in the direction prescribed by arrows 4-4.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
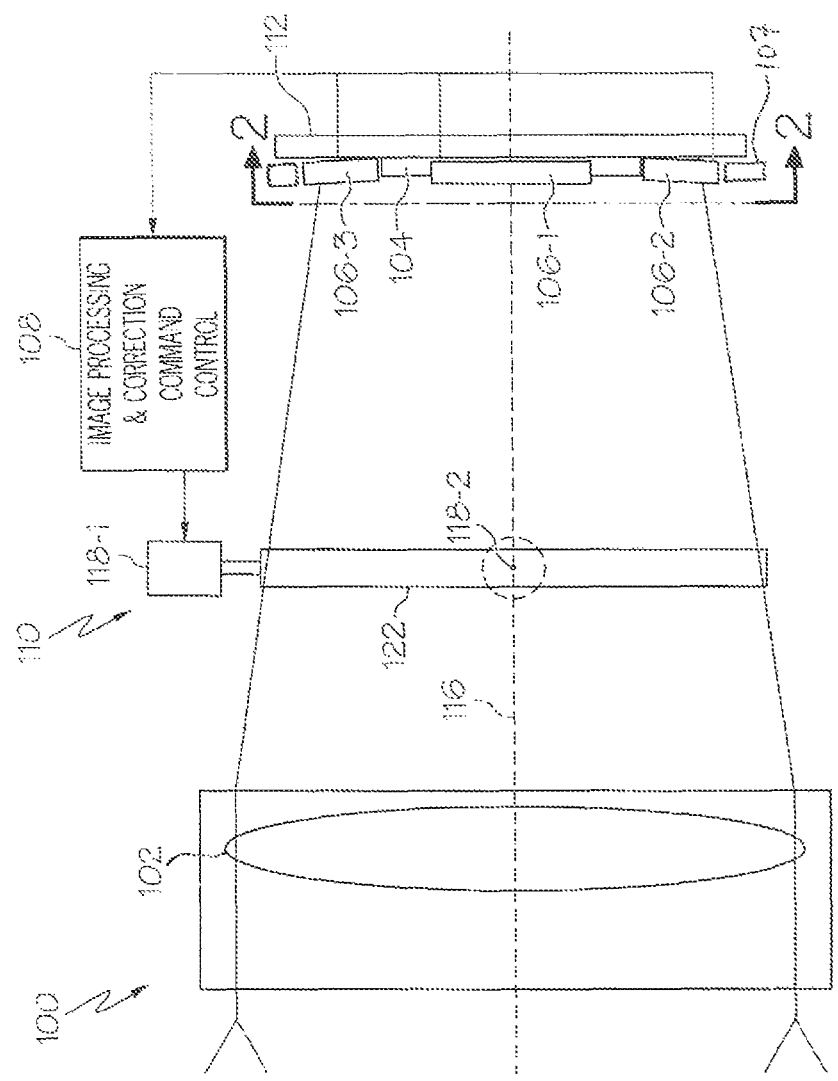
FIG. 1 depicts a schematic representation of one embodiment of an image stabilization and tracking system.

Referring first to FIG. 1, a schematic representation of one embodiment of an image stabilization and tracking system 100 is depicted, and includes an imaging optic 102, a primary imaging detector 104, a plurality of stabilization and tracking detectors 106 (106-1, 106-2, 106-3, 106-4), an image processing and correction control 108, and an adaptive optic device 110. The imaging optic 102 is adapted to receive electromagnetic radiation and is configured, upon receipt of the electromagnetic radiation, to form an optic image at a focal plane, and within a defined optic field 202 (see FIG. 2). In the depicted embodiment, the imaging optic 102 is implemented using a lens. It will be appreciated, however, that it may be any one of numerous devices or combination of devices that collects, magnifies/de-magnifies, concentrates/de-concentrates, corrects, or modifies electromagnetic radiation received from and/or transmitted to an object and forms an optic image of the object.

Figure 2:
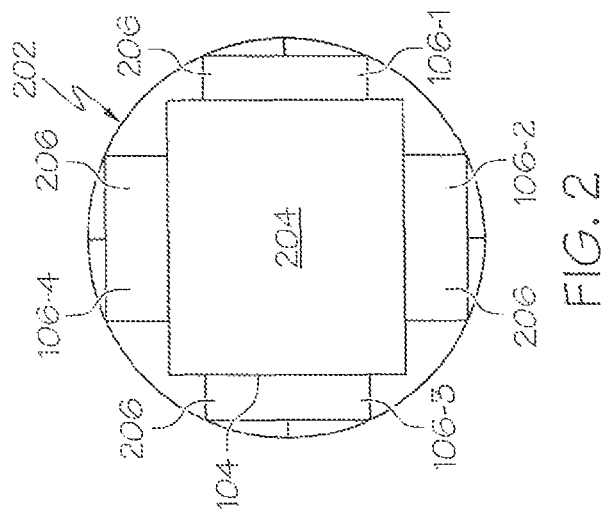
FIG. 2 depicts a portion of the system depicted in FIG. 1, looking in the direction prescribed by arrows 2-2.

As shown more clearly in FIG. 2, the primary imaging detector 104 includes a sensitive region 204 that defines a field of view. The primary imaging detector 104 is mounted on a mounting surface 112, and is disposed at the focal plane and within the defined optic field 202. It is noted that the focal plane is located at the surface of the primary imaging detector 104 that is facing the imaging optic 102. The primary imaging detector 104 is configured to detect, within its field of view, images of a primary object in the optic image that is formed by the imaging optic 102. It will be appreciated that the primary imaging detector 104 may be variously implemented, and may comprise one or more detectors (in an array) that cover the primary imaging detector field of view 204. For example, it may be implemented using a CCD (charge-coupled device), a CMOS (complementary metal oxide semiconductor) device, or any one of numerous other devices, now known or developed in the future, configured to receive electromagnetic radiation and convert it into a signal that is readable by an observer or an instrument.

As FIG. 2 also depicts most clearly, the stabilization and tracking detectors 106 are each disposed outside of the field of view of the primary imaging detector 104 but, at least in the depicted embodiment, are also mounted on the mounting surface 112, and are disposed at the focal plane and within the defined optic field 202. Each of the stabilization and tracking detectors 106 also includes a sensitive region 206 that defines a field of view. As will be explained in more detail below, the stabilization and tracking detectors 106 are each configured to detect, within their respective fields of view, images of one or more tracking objects in the optic image that is formed by the imaging optic 102.

The stabilization and tracking detectors 106 may be mounted such that the sensitive regions 206 thereof are disposed perpendicular to the optical system axis 116. This mounting configuration enables the tracking and stabilization detectors 106 to detect one or more target objects outside of the field of view of the primary imaging detector 104. This mounting configuration may be advantageous for telescope star tracking applications. Alternatively, as depicted in FIG. 1, the stabilization and tracking detectors 106 may be mounted such that the sensitive regions 206 are disposed inwardly toward the optical system axis 116. This mounting configuration enables the tracking and stabilization detectors 106 to detect the same primary object that is detected by the primary imaging detector 104 for use as a tracking object. This mounting configuration may be advantageous for missile tracking or a sports photography applications, where is it may be desirable to center and stabilize the object of interest in the imaging frame. It will additionally be appreciated that the stabilization and tracking detectors 106 may be mounted on a multiple degree-of-freedom (DOF) (e.g., up to 6 DOF) platform 107 to provide real-time positioning of the stabilization and tracking detectors 106.

Although the depicted system 100 is implemented using four stabilization and tracking detectors 106, it will be appreciated that the system 100 could be implemented with more or less than this number of stabilization and tracking detectors 106. As with the primary imaging detector 104, the stabilization and tracking detectors 106 may be variously implemented. For example, each stabilization and tracking detector 106 may be implemented using a CCD (charge-coupled device), a CMOS (complementary metal oxide semiconductor) device, or any one of numerous other devices, now known or developed in the future, configured to receive electromagnetic radiation and convert it into a signal that is readable by an observer or an instrument. No matter how the stabilization and tracking detectors 106 are mounted and implemented, each provides images it detects to the image processing and correction command control 108.

The image processing and correction command control 108 is coupled to receive the images of the one or more tracking objects from the stabilization and tracking detectors 106. The image processing and correction control 108 is configured to detect relative movement of one or more of the tracking objects and supply correction commands to the adaptive optic device 110. The image processing and correction command control 108 is also preferably configured to allow a user to select the one or more tracking objects. Moreover, for those embodiments in which the stabilization and tracking detectors 106 are mounted on a multiple degree-of-freedom platform 107, the image processing and correction command control 108 is further configured to control pre-positioning or real-time positioning of the stabilization and tracking detectors 106. It will be appreciated that the image processing and correction command control 108 may be implemented using one or more programmed processors, digital signal processors (DSPs) microcontrollers, and/or application specific devices.

The adaptive optic device 110 is coupled to receive the correction commands supplied by the image processing and correction command control 108. The adaptive optic device 100 is configured, in response to the correction commands, to move and thereby vary a position of the optic image that is formed by the imaging optic 102. The adaptive optic device 110 may be variously configured and implemented to carry out this function. In the depicted embodiment, however, it comprises a plurality of actuators 118-1, 118-2 and an optic device 122, such as a tip/tilt optic device. The actuators 118-1, 118-2, which may be implemented using any one of numerous know actuation devices, are coupled to receive the correction commands from the image processing and correction command control 108. The actuators 118-1, 118-2, in response to the correction commands, supply a drive force to the optic device 122, which causes it to move and vary the position of the optic image. The optic device 122 may be implemented using an optically transmissive device or an optically reflective device.

As was noted above, with the system 100 depicted in FIG. 1, the one or more stabilization and tracking detectors 106 are disposed outside of the field of view of the primary imaging detector 104 but within the defined optic field 202. The one or more stabilization and tracking detectors 106 may additionally be disposed to detect one or more target images within the field of view of the primary imaging detector 104, outside of the field of view of the primary imaging detector 104, or a combination of both. This configuration allows the one or more stabilization and tracking detectors 106 to use any one or more objects inside the defined optic field 202, whether within, or outside of, the field of view of the primary imaging detector 106, for image stabilization and tracking purposes.

The image stabilization and tracking system 100 described above provides relatively high performance optical image stabilization and tracking of user defined objects in a relatively simple, compact package without the need for expensive and complicated tracking systems, such as radar or laser based systems. The described system 100 also provides the ability to simultaneously compensate for imaging system disturbances and motion and object disturbances and motion, and compensates for all motion components simultaneously at most (if not all) of the frequencies for both the imaging device and object being imaged.

As was noted above, stabilization and/or tracking performance may suffer when implemented in filtered imaging applications. The image stabilization and tracking system 300 depicted in FIG. 3 alleviates, if not eliminates, this performance degradation. The depicted system 300 includes an imaging optic 102, a primary imaging detector 104, a plurality of stabilization and tracking detectors 106 (106-1, 106-2, 106-3, 106-4), an image processing and correction control 108, and an adaptive optic device 110. The depicted system 300 additionally includes an optic filter 302 and a decoupling focal reducer 304. The imaging optic 102, primary imaging detector 104, stabilization and tracking detector(s) 106, image processing and correction control 108, and adaptive optic device 110 may be implemented similarly, if not identically, to those depicted in FIG. 1 and described above. Thus, detailed descriptions thereof will not be repeated. It should be noted, however, that the one or more stabilization and tracking detectors 106 are not disposed at the same focal plane as the primary imaging detector 104, but are within the defined optic field 202. The reason for this will become apparent from the subsequent descriptions.

The optic filter 302 is disposed between the primary imaging detector 104 and the one or more stabilization and tracking detectors 106, and is configured to filter a portion of the optic image that is formed by the imaging optic 102. The optic filter 302 may be implemented using any one of numerous optic filtering devices now known or developed in the future. Preferably, the system 300 and optic filter 302 are configured to allow interchangeability of different types of optic filters 302.

The decoupling focal reducer 304 is disposed between the adaptive optic device 110 and the one or more stabilization and tracking detectors 106. The decoupling focal reducer 304 is configured to provide a first focal length ($f_1$) within the field of view of the primary imaging detector 104, and a second focal length ($f_2$) outside the field of view of the primary imaging detector 104. As may be readily apparent from FIG. 3, the second focal length is different than, and more specifically less than, the first focal length. Although the decoupling focal reducer 304 may be variously configured and implemented, in the depicted embodiment, and as shown more clearly in FIG. 4, it is implemented using a focal reducer optic having a portion 402 thereof removed. Preferably, the removed portion 402 has the same shape as the sensitive region 204 of the primary imaging detector 104. The removed portion 402 provides the first focal length ($f_1$) to the primary imaging detector 104, whereas the remaining portion provides the second focal length ($f_2$) to the one or more stabilization and tracking detectors 106.

In some embodiments, such as the one depicted in FIG. 3, the imaging optic 102 is disposed within a first housing 306, the one or more stabilization and tracking detectors 106, the image processing and correction control 108, the adaptive optic device 110, the optic filter 202, and the decoupling focal reducer 304 may be disposed within a second housing 308, while the primary imaging detector 104 may be disposed within a third housing 312. This number of housings allows for maximum utility, configurability, and modularity. It will be appreciated that in other embodiments, all of the components may be disposed within a single housing to maximize compactness and minimize weight.

The system 300 depicted in FIG. 3 and described above splits the defined optic field 202 into a portion that is dedicated to the primary imaging detector 104 and a portion that is dedicated to the one or more stabilization and tracking detectors 106 (106-1, 106-2, 106-3, 106-4). Thus, filtered optic images may be provided to the primary imaging detector 104, while unfiltered optic images are provided to the one or more stabilization and tracking detectors 106. This simultaneously provides maximum signal-to-noise ratio and high stabilization and tracking performance within a single, relatively small and compact, package. The image stabilization and tracking system 300 also provides relatively high performance optical image stabilization and tracking of user defined objects in a relatively simple, compact package without the need for expensive and complicated tracking systems, such as radar or laser based systems. The described system 300 additionally provides the ability to simultaneously compensate for imaging system disturbances and motion and object disturbances and motion, and compensates for all motion components simultaneously at most (if not all) of the frequencies for both the imaging device and object being imaged.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An image stabilization and tracking camera having an optical system axis, comprising:
    an imaging optic disposed on the optical system axis, the imaging optic adapted to receive electromagnetic radiation and configured, upon receipt thereof, to form an optic image;
    a primary imaging detector disposed on the optical system axis, the primary imaging detector having a field of view and configured to detect, within the field of view, images of a primary object in the optic image;
    a stabilization and tracking detector disposed outside of the field of view of the primary imaging detector and disposed symmetrically around the optical system axis, the stabilization and tracking detector configured to detect images of a tracking object in the optic image;
    an optic filter disposed between the primary imaging detector and the stabilization and tracking detector and on the optical axis, the optic filter configured to filter a portion of the optic image;
    an image processing and correction command control coupled to receive the images of the tracking object from the stabilization and tracking detector, the image processing and correction command control configured to detect relative movement of the tracking object and supply correction commands;
    an adaptive optic device coupled to receive the correction commands and configured, in response thereto, to move and thereby vary a position of the optic image;
    and a decoupling focal reducer disposed between the adaptive optic device and the stabilization and tracking detector and on the optical axis, the decoupling focal reducer configured to provide (i) a first focal length within the field of view of the primary imaging detector and (ii) a second focal length outside the field of view of the primary imaging detector, the second focal length different than the first focal length.

2. The camera of claim 1, wherein the stabilization and tracking detector is configured such that the images of the tracking object are outside the field of view.

3. The camera of claim 1, wherein the stabilization and tracking detector is configured such that the images of the tracking object are within the field of view.

4. The camera of claim 3, wherein the tracking object is also the primary object.

5. The camera of claim 1, wherein the adaptive optic device is selected from the group consisting of an optically transmissive device and an optically reflective device.

6. The camera of claim 1, wherein the adaptive optic device comprises: an actuator coupled to receive the correction commands and configured, in response thereto, to supply a drive force; and an optic device coupled to receive the drive force and configured, upon receipt thereof, to move and thereby vary the position of the optic image.

7. An image stabilization and tracking camera having an optical system axis, comprising:
- an imaging optic disposed on the optical system axis, the imaging optic adapted to receive electromagnetic radiation and configured, upon receipt thereof, to form an optic image;
- a multiple degree-of-freedom platform adapted to receive positioning commands and configured, upon receipt thereof, to move;
- a primary imaging detector disposed on the optical system axis, the primary imaging detector having a field of view and configured to detect, within the field of view, images of a primary object in the optic image;
- a plurality of stabilization and tracking detectors mounted on the multiple degree-of-freedom platform and disposed outside of the field of view of the primary imaging detector and disposed symmetrically around the optical system axis, each stabilization and tracking detector configured to detect images of one or more tracking objects in the optic image;
- an image processing and correction command control coupled to receive the images of the one or more tracking objects from the stabilization and tracking detectors, the image processing and correction command controller configured to detect relative movement of one of the tracking objects and supply (i) the positioning commands to the multiple degree-of-freedom platform and (ii) correction commands;
- an adaptive optic device coupled to receive the correction commands and configured, in response thereto, to move and thereby vary a position of the optic image;
- an optic filter disposed between the primary imaging detector and the plurality of stabilization and tracking detectors and on the optical axis, the optic filter configured to filter a portion of the optic image; and
- a decoupling focal reducer disposed between the adaptive optic device and the stabilization and tracking detectors and on the optical axis, the decoupling focal reducer configured to provide (i) a first focal length within the field of view of the primary imaging detector and (ii) a second focal length outside the field of view of the primary imaging detector.

* * * * *